United States Patent
Choi et al.

(10) Patent No.: US 11,449,421 B2
(45) Date of Patent: Sep. 20, 2022

(54) MEMORY SYSTEM, MEMORY CONTROLLER AND METHOD FOR MINIMIZING DATA LOSS USING RECOVERY OPERATIONS IN SUDDEN POWER LOSS EVENTS

(71) Applicant: SK hynix Inc., Icheon-si (KR)

(72) Inventors: Min Kyung Choi, Seoul (KR); Ji Yeun Kang, Seongnam-si (KR)

(73) Assignee: SK hynix Inc., Icheon-si (KR)

( * ) Notice: Subject to any disclaimer, the term of this patent is extended or adjusted under 35 U.S.C. 154(b) by 33 days.

(21) Appl. No.: 16/879,998

(22) Filed: May 21, 2020

(65) Prior Publication Data

US 2021/0191863 A1 Jun. 24, 2021

(30) Foreign Application Priority Data

Dec. 20, 2019 (KR) .......................... 10-2019-0171457

(51) Int. Cl.
*G06F 12/0804* (2016.01)
*G06F 12/02* (2006.01)

(52) U.S. Cl.
CPC ...... *G06F 12/0804* (2013.01); *G06F 12/0253* (2013.01); *G06F 2212/1032* (2013.01)

(58) Field of Classification Search
None
See application file for complete search history.

(56) References Cited

U.S. PATENT DOCUMENTS

| 2009/0172466 | A1* | 7/2009 | Royer | G06F 11/1064 714/6.12 |
| 2014/0115232 | A1* | 4/2014 | Goss | G06F 11/1471 711/103 |
| 2018/0101454 | A1* | 4/2018 | Lee | G06F 3/064 |
| 2018/0307496 | A1* | 10/2018 | Ke | G06F 11/0757 |
| 2020/0004971 | A1* | 1/2020 | Secatch | G06F 11/1096 |

FOREIGN PATENT DOCUMENTS

| KR | 10-2017-0002848 A | 1/2017 |
| KR | 10-2018-0039785 A | 4/2018 |
| KR | 10-2019-0009573 A | 1/2019 |

* cited by examiner

*Primary Examiner* — Jared I Rutz
*Assistant Examiner* — Marwan Ayash
(74) *Attorney, Agent, or Firm* — Perkins Coie LLP

(57) ABSTRACT

Embodiments of the disclosed technology relate to a memory system, and a memory controller and a method of operating the same. In performing a recovery operation after occurrence of sudden power off (SPO), by determining whether to delete, from a memory device, journaling information associated with data stored in a target open memory block based on the state of the memory device, thereby preventing unnecessary data movement in a situation where the number of free memory blocks included in the memory device is insufficient, and maintaining the number of free memory blocks included in the memory device to a predetermined value or more.

14 Claims, 15 Drawing Sheets

☐ META_SLICE (empty)

▨ META_SLICE (include journaling information of GC open block)

▨ META_SLICE (do not include journaling information of GC open block)

MEMORY SYSTEM, MEMORY CONTROLLER AND METHOD FOR MINIMIZING DATA LOSS USING RECOVERY OPERATIONS IN SUDDEN POWER LOSS EVENTS

CROSS REFERENCE TO RELATED APPLICATION

This patent document claims the priority and benefits of Korean patent application number 10-2019-0171457 filed on Dec. 20, 2019, which is incorporated herein by reference in its entirety.

TECHNICAL FIELD

Embodiments of the disclosed technology relate to a memory system, and a memory controller and a method of operating the same.

BACKGROUND

A memory system can include a storage device to store data. Such a memory system can operate on the basis of a request from a host, such as computers, servers, mobile devices (e.g., smartphone or tablet PC) or other similar electronic devices. The examples of the memory system span from a traditional hard disk drive (HDD) to a semiconductor-based data storage device such as a solid state drive (SSD), a universal flash storage device (UFS), or an embedded MMC (eMMC) device.

The memory system may further include a memory controller for controlling the memory device. The memory controller may receive a command input from the host, and may execute the command or control read/write/erase operations on the memory devices included in the memory system. The memory controller may be used to run firmware for performing a logical operation for executing or controlling such operations.

Some memory systems are designed to handle sudden power loss by using recovery operations. If a sudden power off (SPO) occurs in the memory system during the read or write operations on the memory devices, the memory system may execute a recovery operation to minimize data loss.

SUMMARY

The technology disclosed in this patent document can be implemented in various embodiments to provide a memory system, and a memory controller and a method of operating the memory system or the memory controller to prevent unnecessary data movement in a situation where the number of free memory blocks included in a memory device is insufficient.

In addition, some embodiments of the disclosed technology may provide a memory system, and a memory controller and a method of operating the memory system or the memory controller to maintain the number of free memory blocks included in a memory device at a predetermined range.

In an aspect, embodiments of the present disclosure may provide a memory system including a memory device having a plurality of memory blocks and a memory controller for controlling the memory device.

The memory controller may be configured to perform a recovery operation after occurrence of sudden power off (SPO).

In performing the recovery operation, the memory controller may determine whether to delete, from the memory device, journaling information associated with data stored in a target open memory block among one or more open memory blocks based on whether the memory device was in a first state when the SPO occurs.

In this case, each of the one or more open memory blocks may include one or more of the plurality of memory blocks.

The memory controller may be configured to determine whether a garbage collection is executed when the SPO occurs.

The memory controller may be configured to determine, after the garbage collection is executed, that the memory device is in the first state when the SPO occurs.

If it is determined that the memory device is in the first state when the SPO occurs, the memory controller may delete the journaling information associated with the data stored in the target open memory block at the time of the recovery operation.

The memory controller may be configured to, after determining that the memory device is in a second state different from the first state when the SPO occurs, the memory controller may migrate, to a migration memory block of the memory device, data for which journaling information is not written to the memory device among data stored in the one or more open memory blocks at the time of the recovery operation.

In this case, the journaling information may include i) logical address, ii) source physical address, or iii) target physical address for data corresponding to the journaling information.

In another aspect, embodiments of the present disclosure may provide a memory controller for a memory device including a plurality of memory blocks, including a memory interface in communication with the plurality of memory blocks of the memory device and a control circuit in communication with the memory interface for controlling the memory device.

In the recovery operation, the control circuit may determine whether to delete, from the memory device, journaling information associated with data stored in a target open memory block among one or more open memory blocks based on whether the memory device is in the first state when the SPO occurs.

In this case, each of the one or more open memory blocks may include one or more of the plurality of memory blocks.

If it is determined that garbage collection is in progress when the SPO occurs, the control circuit may determine that the memory device is in the first state.

If it is determined that the memory device is in the first state when the SPO occurs, the control circuit may delete, from the memory device, the journaling information associated with data stored in the target open memory block at the time of the recovery operation after the SPO event.

If it is determined that the memory device is in a second state different from the first state when the SPO occurs, the control circuit may migrate, to a migration memory block of the memory device, data on which journaling information is not written to the memory device among data stored in the one or more open memory blocks when the recovery operation on the SPO is performed.

In this case, the journaling information may include i) logical address, ii) source physical address, or iii) target physical address for data corresponding to the journaling information.

A method of operating a memory controller may include starting a recovery operation to recover from a sudden power off (SPO).

The method of operating the memory controller may include identifying whether a memory device is in a first state when the SPO occurs.

The method of operating the memory controller may include determining whether to delete, from the memory device, journaling information associated with data stored in a target open memory block among one or more open memory blocks based on whether the memory device is in the first state when the SPO occurs.

In some implementations, a memory system includes a memory device configured to include memory cells for storing data that are divided into a plurality of memory blocks, each memory block including memory cells, and a memory controller configured to control the memory device, and to perform a recovery operation after occurrence of sudden power off (SPO). In performing the recovery operation, the memory controller determines whether to delete, from the memory device, journaling information associated with data stored in a target open memory block, among one or more open memory blocks including one or more of the plurality of memory blocks, based on whether the memory device was in a first state when the SPO occurs.

In some implementations, a memory controller for a memory device including a plurality of memory blocks, includes a memory interface in communication with the plurality of memory blocks of the memory device, and a control circuit in communication with the memory interface to control the memory device and configured to perform a recovery operation from a sudden power off (SPO), wherein, in the recovery operation, the control circuit determines whether to delete, from the memory device, journaling information associated with data stored in a target open memory block, among one or more open memory blocks including one or more of the plurality of memory, blocks based on whether the memory device is in a first state when the SPO occurs.

In some implementations, a memory system includes a memory device configured to include memory cells for storing data that are divided into a plurality of memory blocks, each memory block including memory cells, and a memory controller configured to control the memory device, and to perform a recovery operation after occurrence of sudden power off (SPO). In performing the recovery operation, the memory controller determines whether to delete, from the memory device, journaling information associated with data stored in a target open memory block, among one or more open memory blocks including one or more of the plurality of memory blocks, based on whether the memory device was in a first state when the SPO occurs.

In some implementations, a memory controller for a memory device including a plurality of memory blocks, includes a memory interface in communication with the plurality of memory blocks of the memory device, and a control circuit in communication with the memory interface to control the memory device and configured to perform a recovery operation from a sudden power off (SPO), wherein, in the recovery operation, the control circuit determines whether to delete, from the memory device, journaling information associated with data stored in a target open memory block, among one or more open memory blocks including one or more of the plurality of memory, blocks based on whether the memory device is in a first state when the SPO occurs.

In some implementations, a method of operating a memory controller for controlling a memory device including a plurality of memory blocks, includes starting a recovery operation to recover from a sudden power off (SPO), identifying whether the memory device is in a first state when the SPO occurs, and determining whether to delete, from the memory device, journaling information associated with data stored in a target open memory block, among one or more open memory blocks including one or more of the plurality of memory blocks, based on whether the memory device is in the first state when the SPO occurs.

Based on embodiments of the present disclosure, it is possible to prevent unnecessary data movement in a situation where the number of free memory blocks included in the memory device is insufficient.

In addition, based on various embodiments, it is possible to maintain the number of free memory blocks included in the memory device to a predetermined value or more.

DETAIL DESCRIPTION

Hereinafter, embodiments of the disclosed technology will be described in detail with reference to the accompanying drawings.

Figure 1:
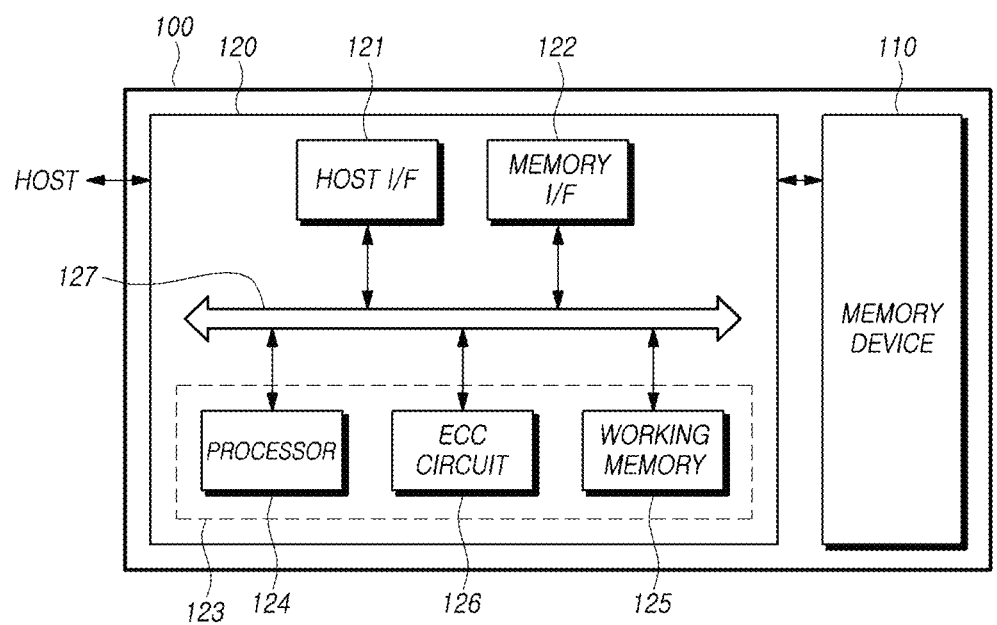
FIG. 1 is a diagram illustrating a schematic configuration of a memory system based on an embodiment of the disclosed technology.

FIG. 1 is a diagram illustrating the schematic configuration of a memory system 100 based on an embodiment of the disclosed technology.

In some implementations, the memory system 100 based on an embodiment of the disclosed technology may include a memory device 110 configured to store data, and a memory controller 120 configured to control the memory device 110.

The memory device 110 may include multiple memory blocks to store data and each memory block may include a predetermined number of memory cells for storing data. The memory device 110 may be configured to operate in response to control signals received from the memory controller 120. Operations of the memory device 110 may include, among others, a read operation, a program operation (also referred to as a "write operation"), and an erasure operation.

The memory cells in the memory device 110 are used to store data and may be arranged in a memory cell array. In some implementations where the memory device 110 is a flash memory device, the memory cell array may be divided into memory blocks of memory cells and each block includes different pages of memory cells. In typical implementations of NAND flash memory devices, a page of cells is the smallest memory unit that can be programmed or written to and the data stored in memory cells can be erased at the block level.

In some implementations, the memory device 110 may be implemented in various types, such as a double data rate synchronous dynamic random access memory (DDR SDRAM), a low power double data rate fourth generation (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, and such an electric charge storage layer can be called a floating gate. In another implementations, the electric charge storage layer may be formed of an insulating material, and such a flash memory device can be called a charge trap flash (CTF).

The memory device 110 may be configured to receive a command and an address from the memory controller 120 to access an area of the memory cell array selected by the address. That is, the memory device 110 may perform an operation corresponding to the received command on a memory area in the memory device having a physical address corresponding to the received address from the controller.

In an implementation, the memory device 110 may perform, among others, a program operation, a read operation, and an erasure operation. During the program operation, the memory device 110 may write ("program") data to a memory area selected by the address. During the read operation, the memory device 110 may read data from a memory area selected by the address. During the erasure operation, the memory device 110 may erase data stored in a memory area selected by the address.

The memory controller 120 may control write (program), read, erasure, and background operations being performed on the memory device 110. The background operation may include operations that are implemented to optimize the overall performance of the memory device 110, such as a garbage collection operation (GC), a wear leveling (WL) operation, and a bad block management (BBM) operation.

The memory controller 120 may control the operation of the memory device 110 at the request of a host. Alternatively, the memory controller 120 may control the operation of the memory device 110 even in absence of request from the host when it performs such a background operation of the memory device.

The memory controller 120 and the host may be separate devices. In some implementations, the memory controller 120 and the host may be integrated in a single device. In the following description, as an example, the memory controller 120 and the host are separate devices.

Referring to FIG. 1, the memory controller 120 may include a memory interface 122, a control circuit 123, and a host interface 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be used to run a flash translation layer (FTL) to effectively manage the memory operations on the memory system 100. For example, the processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host HOST to write the randomized data to the memory cell array. For example, the processor 124 may randomize data received from the host HOST by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) so as to control the operation of the memory controller 120. In other words, the processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In the context of this patent document, a sector may refer to a data unit that is smaller than the read unit (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than the reference value, the error detection/correction circuit 126 may determine that the corresponding sector is correctable or the corresponding sector can be marked "pass."

The error detection/correction circuit 126 may perform error detection and correction operations successively on all read data. When a sector included in the read data is correctable, the error detection/correction circuit 126 may go on to the next sector to check as to whether an error correction operation is needed on the next sector. Upon completion of the error detection and correction operations on all the read data in this manner, the error detection/correction circuit 126 may acquire information about which sector is deemed uncorrectable in the read data. The error detection/correction circuit 126 may provide such information (e.g., address of uncorrectable bits) to the processor 124.

The memory system 100 may also include a bus 127 to provide a channel between the constituent elements 121, 122, 124, 125, and 126 of the memory controller 120. The bus 127 may include, for example, a control bus for delivering various kinds of control signals and commands, and a data bus for delivering various kinds of data.

The constituent elements 121, 122, 124, 125, and 126 of the memory controller 120 are illustrated in FIG. 1 by way of example. It is noted that some of those illustrated in the drawings may be omitted, or some of the above-mentioned constituent elements 121, 122, 124, 125, and 126 of the memory controller 120 may be integrated into a single element. Also, in some implementations, one or more other constituent elements may be added to the above-mentioned constituent elements of the memory controller 120.

Hereinafter, the memory device 110 will be described in more detail with reference to FIG. 2.

Figure 2:
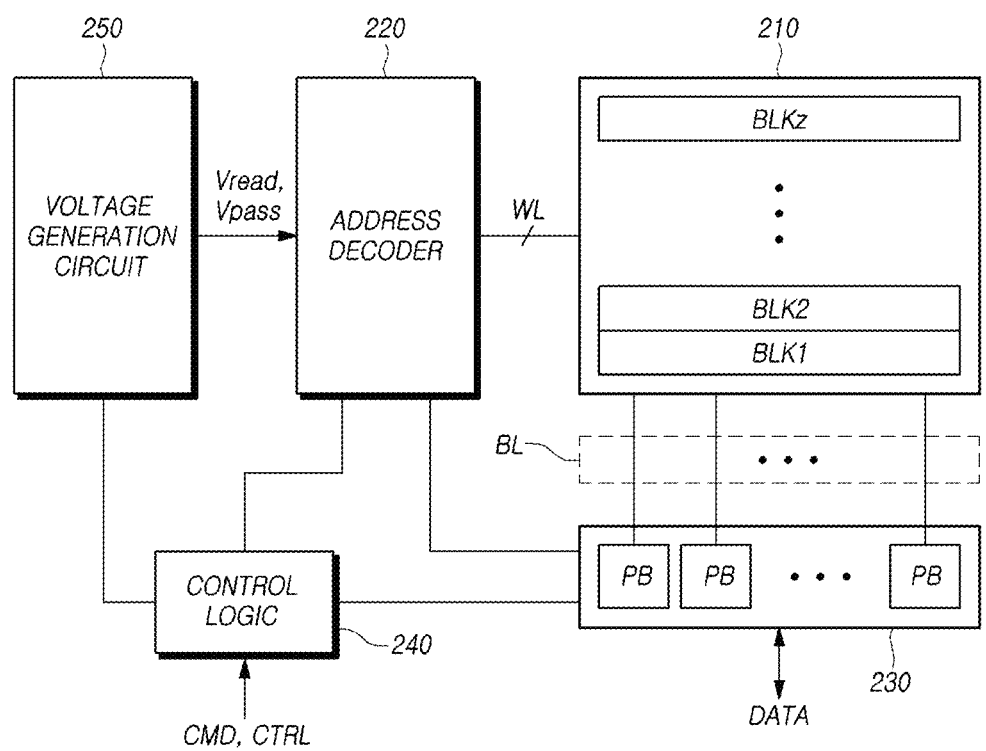
FIG. 2 is a block diagram schematically illustrating a memory device based on an embodiment of the disclosed technology.

FIG. 2 is a block diagram schematically illustrating a memory device 110 based on an embodiment of the disclosed technology.

In some implementations, the memory device 110 based on an embodiment of the disclosed technology may include a memory cell array 210, an address decoder 220, a read/write circuit 230, a control logic 240, and a voltage generation circuit 250.

The memory cell array 210 may include multiple memory blocks BLK1-BLKz (z is a natural number equal to or larger than 2).

In the multiple memory blocks BLK1-BLKz, multiple word lines WL and multiple bit lines BL may be disposed in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure, and, in some implementations, may be arranged in a three-dimensional structure.

Each of the multiple memory cells included in the memory cell array 210 may store at least one bit of data. For example, each of the multiple memory cells included in the memory cell array 210 may be a single-level cell (SLC) configured to store one bit of data per memory cell. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As another example, each of the multiple memory cells included in the memory cell array 210 may be a quad-level cell (QLC) configured to store four bits of data per memory cell. As another example, the memory cell array 210 may include multiple memory cells that are configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to command and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 250 may apply the read voltage Vread to a selected word line WL inside a selected memory block during a read operation, and may apply the pass voltage Vpass to the remaining non-selected word lines WL.

The address decoder 220 may apply a verification voltage generated by the voltage generation circuit 250 to a selected word line WL inside a selected memory block during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that can hold data for data processing and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, an electric change proportional to the current based on the program state of a corresponding memory cell, and may "latch" the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

Figure 3:
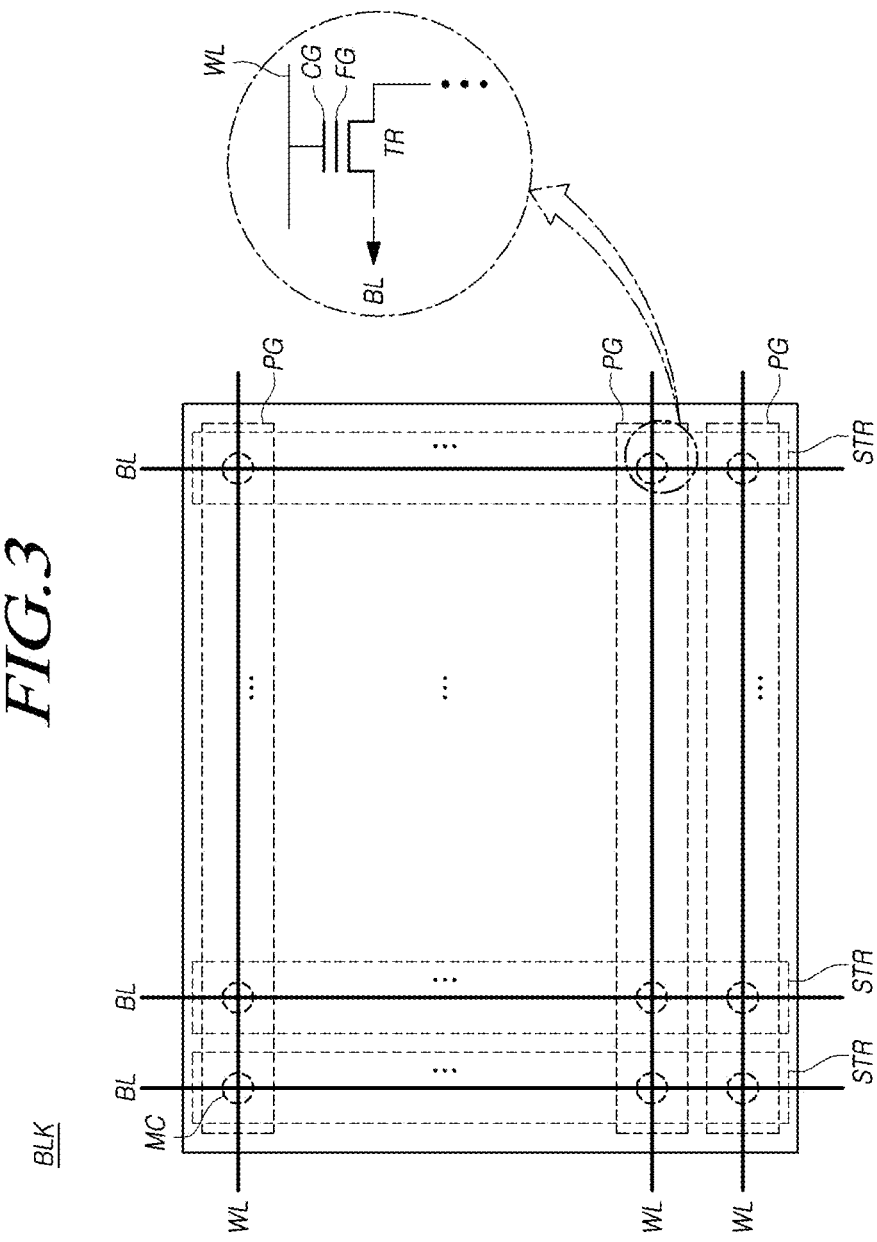
FIG. 3 is a diagram schematically illustrating a memory block of a memory device based on an embodiment of the disclosed technology.

FIG. 3 is a diagram schematically illustrating a memory block BLK of a memory device 110 based on an embodiment of the disclosed technology.

In some implementations, memory cells in a memory block BLK included in the memory device 110 may be arranged rows and columns such that memory cells are arranged in rows (word line direction) to form multiple pages PG and arranged in columns (bit line direction) to form multiple strings TTR.

As such, the multiple pages PG correspond to multiple word lines WL, and the multiple strings STR correspond to multiple bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

In some example memory cell arrays, the multiple word lines WL and the multiple bit lines BL may intersect with each other, thereby addressing a single memory cell in the array of multiple memory cells MC. In some implementations, each memory cell MC may include a transistor TR that includes a material layer that can hold an electrical charge.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

In the case of a memory block structure as illustrated in FIG. 3, a read operation and a program operation (write operation) may be performed page by page, and an erasure operation may be performed memory block by memory block.

Figure 4:
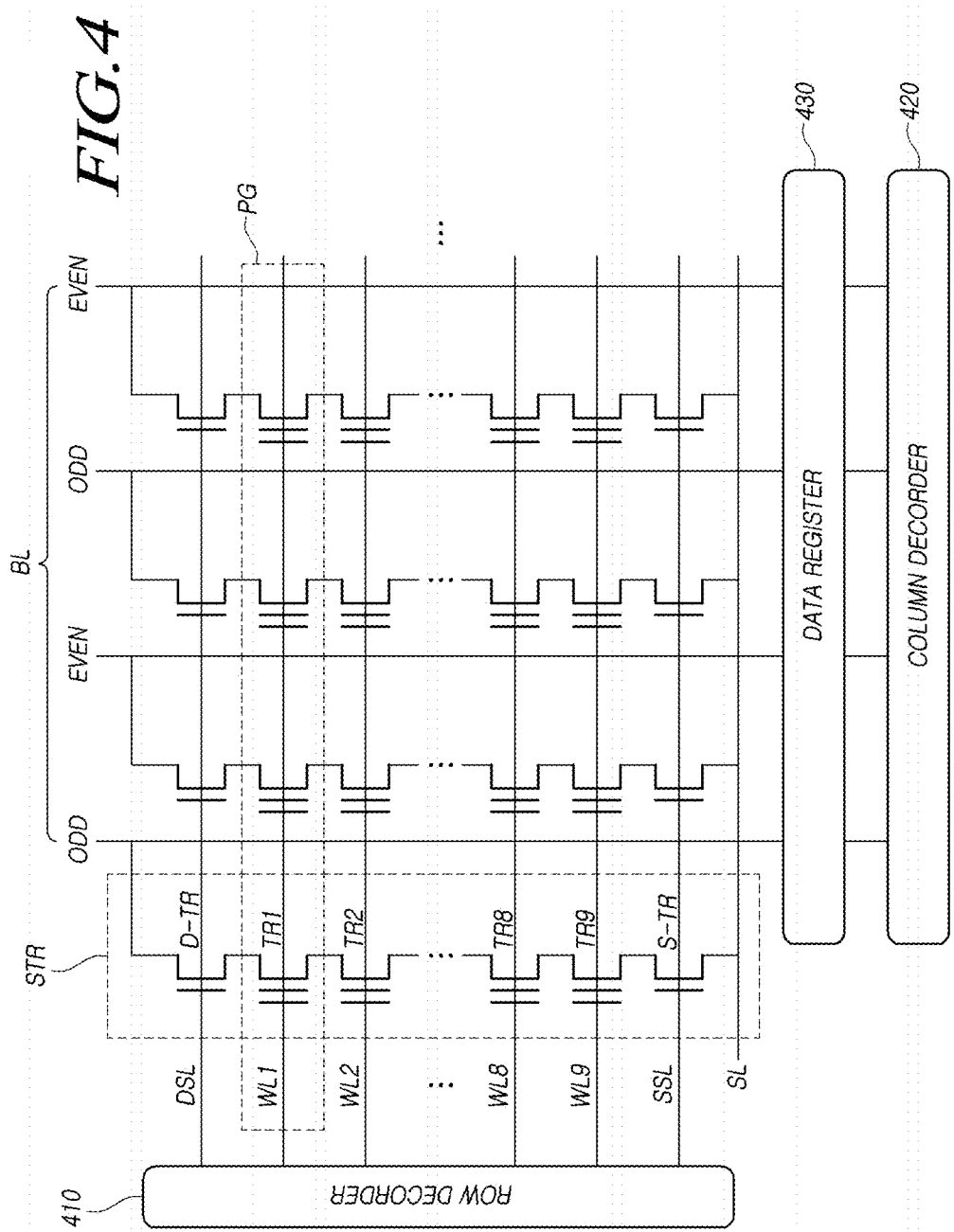
FIG. 4 is a diagram illustrating the structure of word lines and bit lines of a memory device based on an embodiment of the disclosed technology.

FIG. 4 is a diagram illustrating a structure of word lines WL and bit lines BL of a memory device 110 based on an embodiment of the disclosed technology.

In some implementations, the memory device 110 has a core area in which memory cells MC are arranged, and an auxiliary area (the remaining area other than the core area) to include circuitry that is used to perform the operations of the memory cell array 210.

In the core area, a certain number of memory cells arranged in one direction can be called page PG, and a certain number of memory cells that are coupled in series can be called memory string STR.

The word lines WL1-WL9 may be connected to a row decoder 410. The bit lines BL may be connected to a column decoder 420. A data register 430, which corresponds to the read/write circuit 230 of FIG. 2, may exist between the multiple bit lines BL and the column decoder 420.

The multiple word lines WL1-WL9 may correspond to multiple pages PG.

For example, each of the multiple word lines WL1-WL9 may correspond to one page PG as illustrated in FIG. 4. In contrast, when each of the multiple word lines WL1-WL9 has a large size, each of the multiple word lines WL1-WL9 may correspond to at least two (e.g., two or four) pages PG. Each page PG is the smallest unit in a program operation and a read operation, and all memory cells MC within the same page PG may perform simultaneous operations when conducting a program operation and a read operation.

The multiple bit lines BL may be connected to the column decoder 420. In some implementations, the multiple bit lines BL may be divided into odd-numbered bit lines BL and even-numbered bit lines BL such that a pair of odd-numbered bit line BL and even-numbered bit line B are coupled in common to a column decoder 420.

In accessing a memory cell MC, the row decoder 410 and the column decoder 420 are used to locate a desired memory cell based on the address.

In some implementations, the data register 430 plays an important role because all data processing by the memory device 110, including program and read operations, occurs via the data register 430. If data processing by the data register 430 is delayed, all the other areas need to wait until the data register 430 finishes the data processing, degrading the overall performance of the memory device 110.

Referring to the example illustrated in FIG. 4, in one string STR, multiple transistors TR1-TR9 are connected to multiple word lines WL1-WL9, respectively. In some implementations, the multiple transistor TR1-TR9 correspond to memory cells MC. In one example, each of the multiple transistors TR1-TR9 includes a control gate CG and a floating gate FG.

The multiple word lines WL1-WL9 include two outermost word lines WL1 and WL9. A first selection line DSL may be additionally arranged outside the first outermost word line WL1, which is closer to the data register 430 and has a shorter signal path compared to the other outermost word line WL9, and a second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch circuit that connect the corresponding string STR to the data register 430. The second selection transistor S-TR is used as a switch circuit that connects the corresponding string STR to the source line SL. That is, the first selection transistor D-TR and the second selection transistor S-TR can be used to enable or disable the corresponding string STR.

In some implementations, the memory system 100 applies a predetermined turn-on voltage Vcc to the gate electrode of the first selection transistor D-TR, thereby turning on the first selection transistor D-TR, and applies a predetermined turn-off voltage (e.g., 0V) to the gate electrode of the second selection transistor S-TR, thereby turning off the second selection transistor S-TR.

The memory system 100 turns on both the first selection transistor D-TR and the second selection transistor S-TR during a read operation or a verification operation. Accordingly, an electric current may flow through the corresponding string STR and drain to the source line SL, which corresponds to the ground, such that the voltage level of the bit line BL can be measured. However, during a read operation, there may be a time difference in on/off timing between the first selection transistor D-TR and the second selection transistor S-TR.

The memory system 100 may apply a predetermined voltage (e.g., +20V) to the substrate through a source line SL during an erasure operation. The memory system 100 applies a certain voltage to allow both the first selection transistor D-TR and the second selection transistor S-TR to float during an erasure operation. As a result, the applied erasure voltage can remove electrical charges from the floating gate FG of the selected memory cells.

Figure 5:
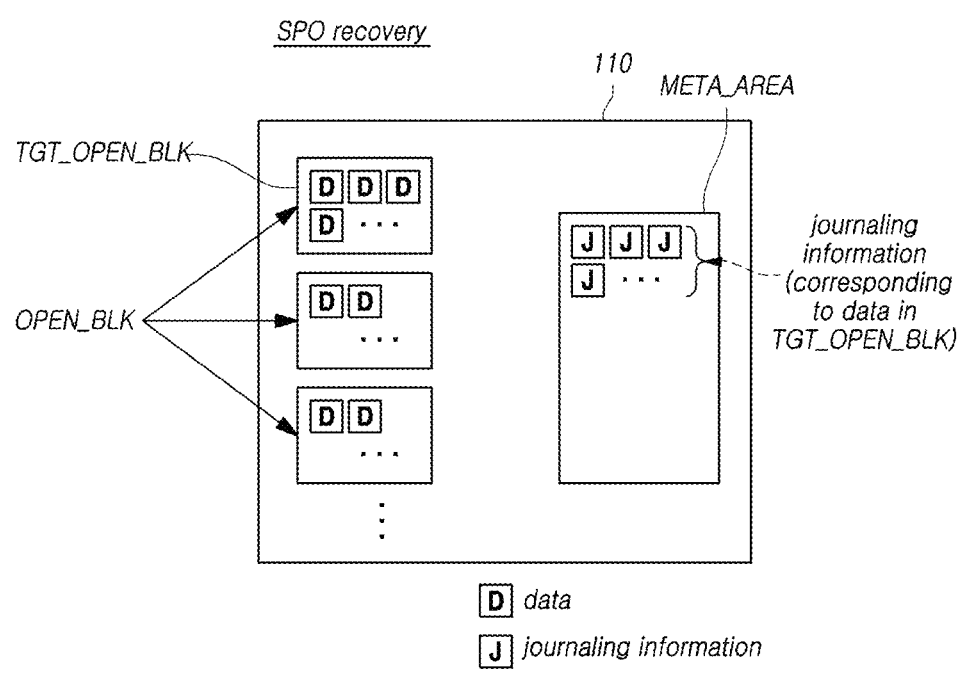
FIG. 5 is a diagram illustrating a state when a memory system performs a recovery operation upon the occurrence of sudden power off (SPO) events based on some embodiments of the disclosed technology.

FIG. 5 is a diagram illustrating a state when a memory system 100 performs a recovery operation upon the occurrence of sudden power off (SPO) events based on some embodiments of the disclosed technology.

In some implementations, when a recovery operation is performed after the SPO events, the memory device 110 included in the memory system 100 includes one or more open memory blocks OPEN_BLK.

In some implementations, an open block can indicate a block that stores data in at least one logical page but still includes unwritten free pages. For example, the one or more open memory blocks OPEN_BLK may refer to one or more memory blocks in which data can be written by a write operation or a background operation (e.g. garbage collection, read reclaim) or other operations requested by a host HOST. When the memory controller 120 included in the memory system 100 completes an operation of writing data to the open memory blocks OPEN_BLK, the memory controller 120 may close the corresponding open memory block OPEN_BLK, so that data may be no longer written to the corresponding open memory block OPEN_BLK.

In this case, each of the open memory blocks OPEN_BLK may include one or more unwritten free pages to which the host or the background operations can write data. In some implementations, the open memory blocks OPEN_BLK may include an open block for host writes and an open block for garbage collection (GC).

The memory device 110 may include a meta-area META_AREA that stores meta information (e.g., mapping information between a logical address and a physical address, read count/erase count of a memory block in which user data is stored) about user data stored in the memory device 110.

Figure 9:
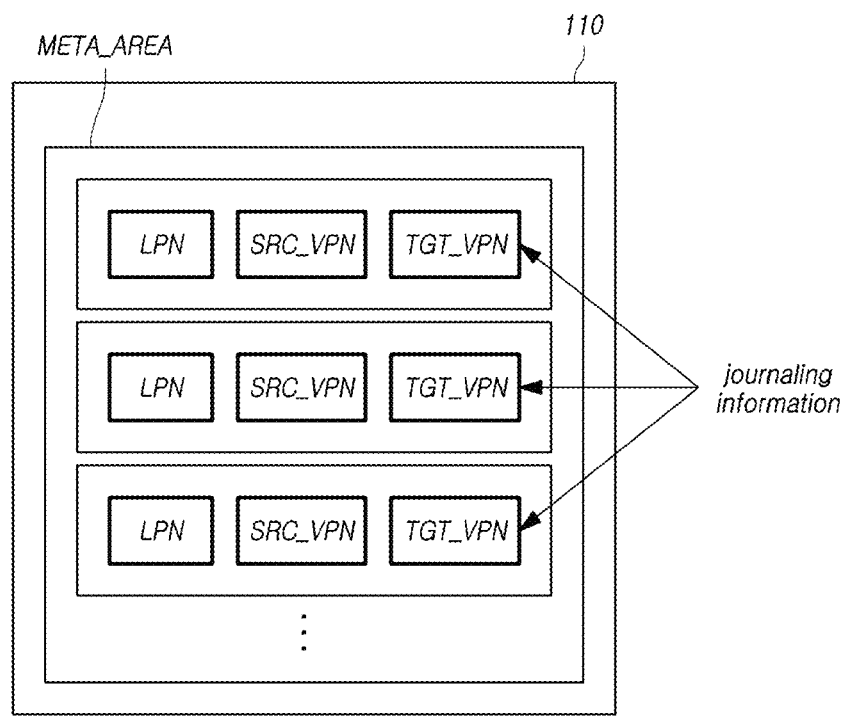
FIG. 9 is a diagram illustrating a structure of journaling information stored in a memory device based on some embodiments of the disclosed technology.

The meta-area META_AREA of the memory device 110 may store journaling information associated with data stored in a target open memory block TGT_OPEN_BLK among the one or more open memory blocks OPEN_BLK described above. The journaling information refers to information that includes logfile or other logging information associated with the data stored in the memory device 110. In some implementations, the structure of the journaling information may be implemented as shown in FIG. 9.

A journaling file system is a file system that keeps track of changes not yet committed by recording the intentions of such changes in a "journal." In the event of a power failure, such file systems can be brought back to complete the intended changes.

In some implementations, a journaling file system may only keep track of stored metadata. In other implementations, a journaling file system may track both stored data and related metadata.

In some embodiments of the disclosed technology, when the recovery operation on the SPO is performed, when the state of the memory device 110 is the same as that of FIG. 5, the memory controller 120 included in the memory system 100 may determine whether to delete the journaling information on data stored in the above-described target open memory block TGT_OPEN_BLK from the memory device 110 based on whether the memory device 110 is in a first state when the SPO occurs.

In some embodiments of the disclosed technology, the first state indicates that garbage collection was in progress when the SPO event occurred.

Hereinafter, a process of performing the recovery operation on the SPO by the memory controller 120 and a process of determining whether the memory device 110 is in the first state will be described.

Figure 6:
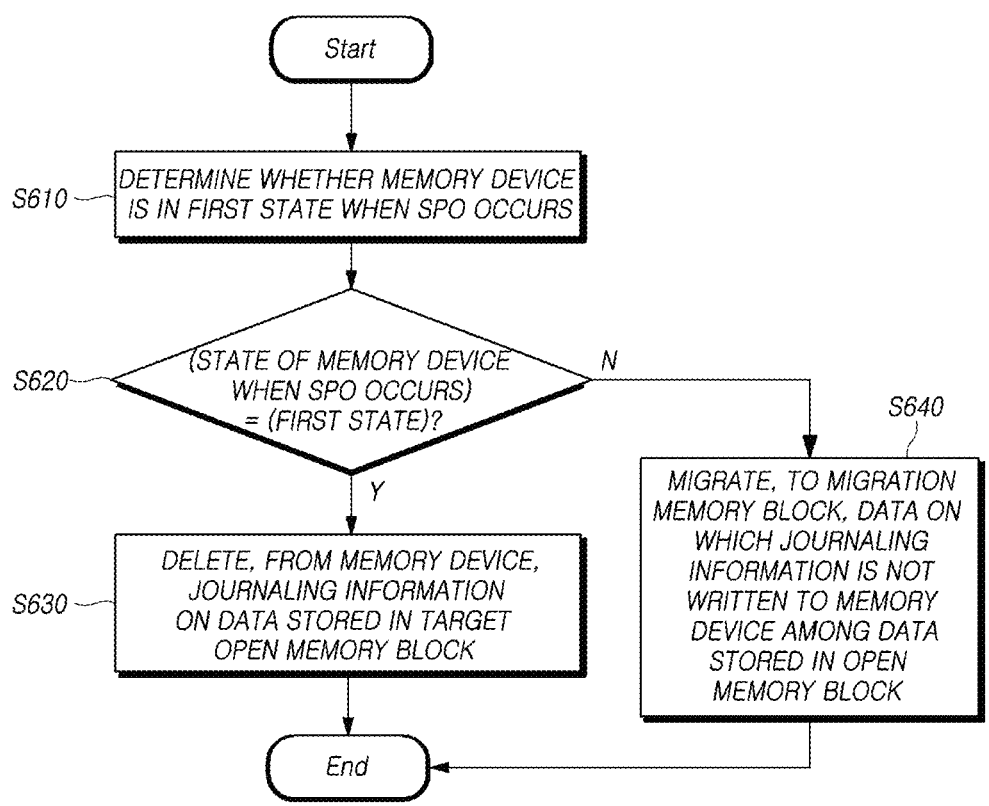
FIG. 6 is a flowchart illustrating a process of performing a recovery operation upon the occurrence of sudden power off (SPO) events by a memory system based on some embodiments of the disclosed technology.

FIG. 6 is a flowchart illustrating a process of performing a recovery operation upon the occurrence of sudden power off (SPO) events at the memory system 100 based on some embodiments of the disclosed technology.

At operation S610, the memory controller 120 included in the memory system 100 may first determine whether the memory device 110 is in the first state when the SPO occurs. In some implementations, the memory device 110 may use a flag signal to indicate that the memory device 110 is in the first state. For example, when a flag value stored in the memory device 110 is set to a predetermined value, the memory controller 120 may determine that the memory device 110 is in the first state. As will be discussed below with reference to FIG. 7, the memory controller 120 may perform recovery after SPO events differently depending on whether the memory device 110 was in a first state or a second state when the SPO occurred.

If the memory device 110 indicates that it was in the first state (S620-Y) when the SPO occurred, at operation S630, the memory controller 120 may delete the journaling information associated with the data stored in the target open memory block TGT_OPEN_BLK illustrated in FIG. 5 from the memory device 110. Operation S630 will be described in detail later with reference to FIG. 8.

On the other hand, if the state of the memory device 110 was not in the first state (S620-N) when the SPO occurred, at operation S640, the memory controller 120 may migrate, to a migration memory block, data where its journaling information had not been written to the memory device 110, among data stored in the one or more open memory block OPEN_BLK illustrated in FIG. 5. Operation S640 will be described in detail later with reference to FIGS. 12 and 13.

Figure 7:
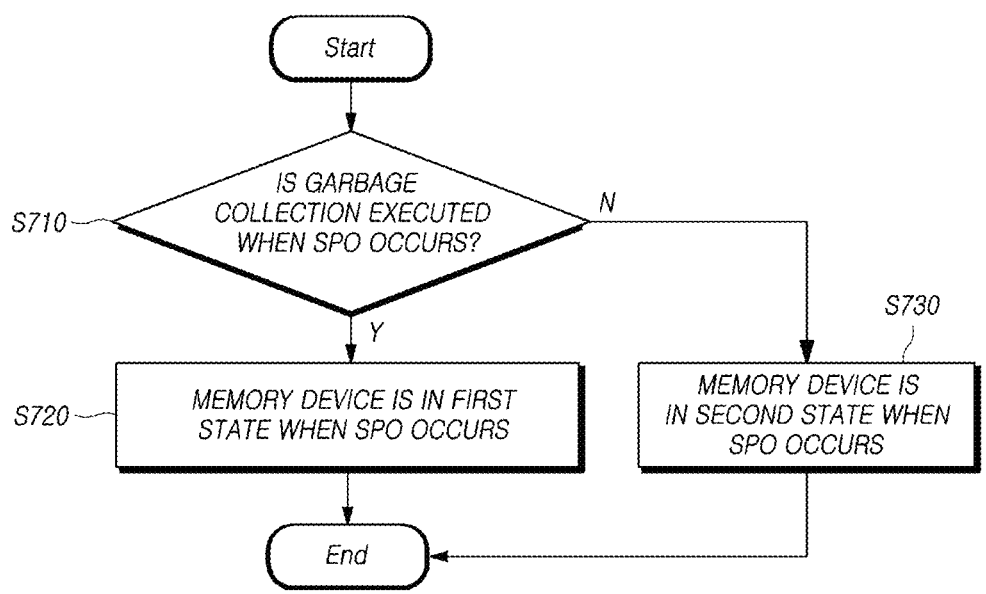
FIG. 7 is a flowchart illustrating an example of a process of determining, by a memory system, a state of a memory device when SPO occurs based on some embodiments of the disclosed technology.

FIG. 7 is a flowchart illustrating an example of a process of determining, by the memory system 100, a state of the memory device 110 when SPO occurs based on some embodiments of the disclosed technology.

In operation 710, the memory controller 120 included in the memory system 100 may determine whether garbage collection (GC) is being executed when the SPO occurs. For example, when a flag indicating the GC is in the memory device 110, the memory controller 120 may determine that the GC was being executed when the SPO occurred.

If it is determined that the GC was being executed when the SPO occurred (S710—Y), at operation 720, the memory controller 120 may determine that the memory device 110 is in the first state.

On the other hand, if it is determined that the GC was not being executed when the SPO occurred (S710—N), at operation 730, the memory controller 120 may determine that the memory device 110 is in a second state different from the first state.

In some implementations, the memory controller 120 can determine that the memory device 110 is in the first state if the GC was in progress and no other operations (e.g. read/write/erase operations) were being executed when the SPO occurred, the memory controller 120 may determine that the memory device 110 is in the first state.

In some implementations, the memory system 100 performs a particular recovery operation recovering from the SPO event if the memory device 110 is in the first state.

Figure 8:
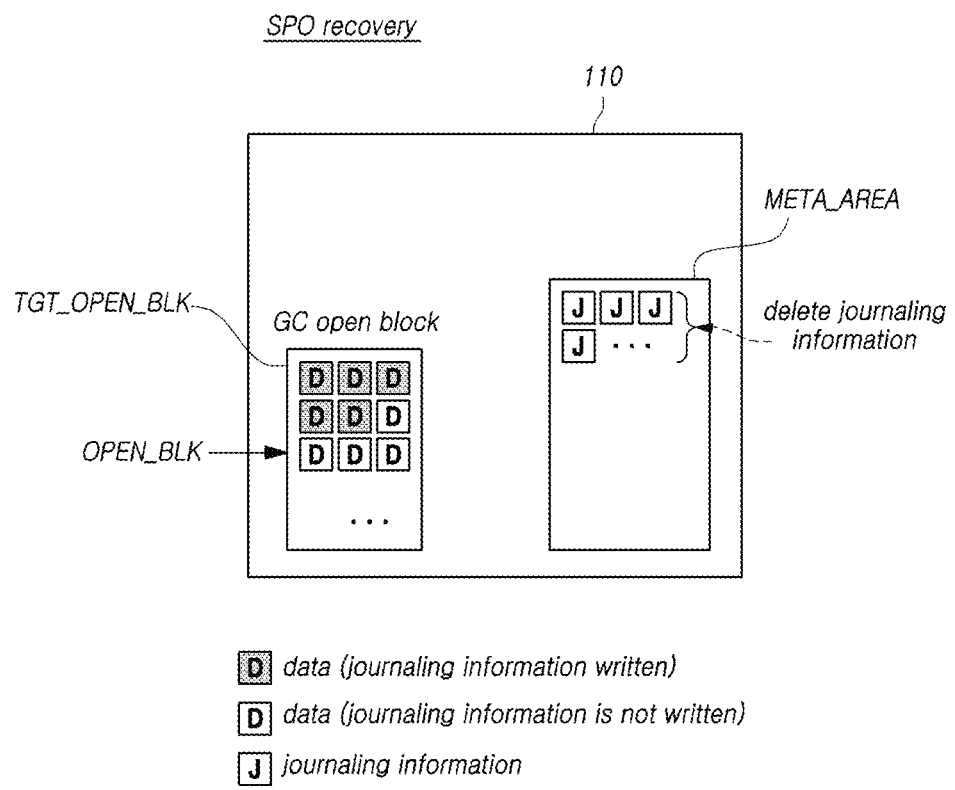
FIG. 8 is a diagram illustrating an example of performing a recovery operation after the SPO events by a memory system based on some embodiments of the disclosed technology.

FIG. 8 is a diagram illustrating an example of performing a recovery operation after the SPO events by the memory system 100 based on embodiments of the disclosed technology.

In some implementations, if the state of the memory device 110 was in the first state when the SPO occurred, the target open memory block TTG_OPEN_BLK included in the memory device 110 may be an open memory block OPEN_BLK for GC. The open memory block OPEN_BLK for GC is an open memory block OPEN_BLK to which valid data stored in another memory block is migrated during a GC operation. That is, the open memory block OPEN_BLK for GC may be an open memory block that stores data migrated from other memory blocks as a result of a garbage collection operation (GC).

In this case, only one target open memory block TTG_OPEN_BLK described above may exist as the open memory block OPEN_BLK included in the memory device 110. That is, while the memory controller 120 performs the GC operation, an operation of writing data received from the host HOST or a read reclaim operation may be stopped, and thus only the open memory block OPEN_BLK for GC may exist.

In this case, the memory controller 120 may delete the journaling information associated with the data stored in the target open memory block TTG_OPEN_BLK stored in the meta-area META_AREA within the memory device 110 from the memory device 110.

In performing a recovery operation after an SPO event, the memory controller 120 can have advantages as discussed below by deleting the journaling information associated with the data stored in the target open memory block TTG_OPEN_BLK.

In some implementations, during the recovery operation after the SPO events, the memory controller 120 may migrate, to a new open memory block or a free block, data that does not have its corresponding journaling information, among data stored in the existing open memory block OPEN_BLK existing when the SPO occurs. Next, the memory controller 120 may close the existing open memory block OPEN_BLK and then perform a refresh operation to migrate the data stored in the existing open memory block OPEN_BLK to another memory block. This is because the data stored in the existing open memory block OPEN_BLK may have been damaged due to the SPO.

However, the migration of data to the new open memory block as described above may result in a crease in the number of free memory blocks among the memory blocks included in the memory device 110. In particular situation where the memory controller 120 performs garbage collection (GC) when the number of free memory blocks included in the memory device 110 is insufficient, the performance degradation of the entire memory system 100 that occurs due to the decrease in the number of free memory blocks may be significant.

On the other hand, while the garbage collection (GC) is being performed, data stored in the open memory block OPEN_BLK for GC may be stored in a victim memory block that is a target of the garbage collection (GC). Therefore, even if the data stored in the open memory block OPEN_BLK for GC is deleted, the garbage collection (GC) may be performed on the data stored in the victim memory block. Therefore, the data stored in the open memory block OPEN_BLK for GC may be deleted without being migrated to the new open memory block.

Accordingly, the memory controller 120 may delete, from the memory device 110, the journaling information on the data stored in the target open memory block TGT_OPEN_BLK at the time of the recovery operation after the SPO events, that is, the data stored in the open memory block OPEN_BLK for the garbage collection (GC).

In this way, the memory controller 120 may prevent the number of free memory blocks included in the memory device 110 from decreasing by generating the new open memory block at the time of the recovery operation on the SPO, and may maintain the number of free memory blocks included in the memory device 110 at a certain desirable level.

In addition, the memory controller 120 may prevent the data stored in the target open memory block TTG_OPEN_BLK from moving unnecessarily to the new open memory block.

The above-described journaling information and a specific deletion operation may be implemented as discussed below.

FIG. 9 is a diagram illustrating a structure of journaling information stored in the memory device 110 based on embodiments of the disclosed technology.

In some implementations, journaling information stored in the meta-area META_AREA of the memory device 110 may include at least one of the following: i) logical address; ii) source physical address; and iii) target physical address for data corresponding to journaling information.

In this case, the size of the data corresponding to each piece of journaling information may be one page (e.g. 4 KB or 8 KB).

The logical address of the data corresponding to the journaling information may be an address used for the host HOST to identify the logical location of the corresponding data.

The source physical address of the data corresponding to the journaling information may be an address indicating a location where the corresponding data is stored on the memory device 110 before the data is migrated to the target open memory block TTG_OPEN_BLK.

The target physical address of the data corresponding to the journaling information may be an address indicating a location where the corresponding data is stored on the memory device 110 after the data is migrated to the target open memory block TTG_OPEN_BLK.

When the amount of the journaling information stored in the memory device 110 is equal to or greater than a predetermined threshold value, the memory controller 120 may update a mapping table based on the stored journaling information and then erase the journaling information reflected in the mapping table. The mapping table refers to a table that stores mapping information between a logical address and a physical address for user data stored in the memory device 110.

Figure 10:
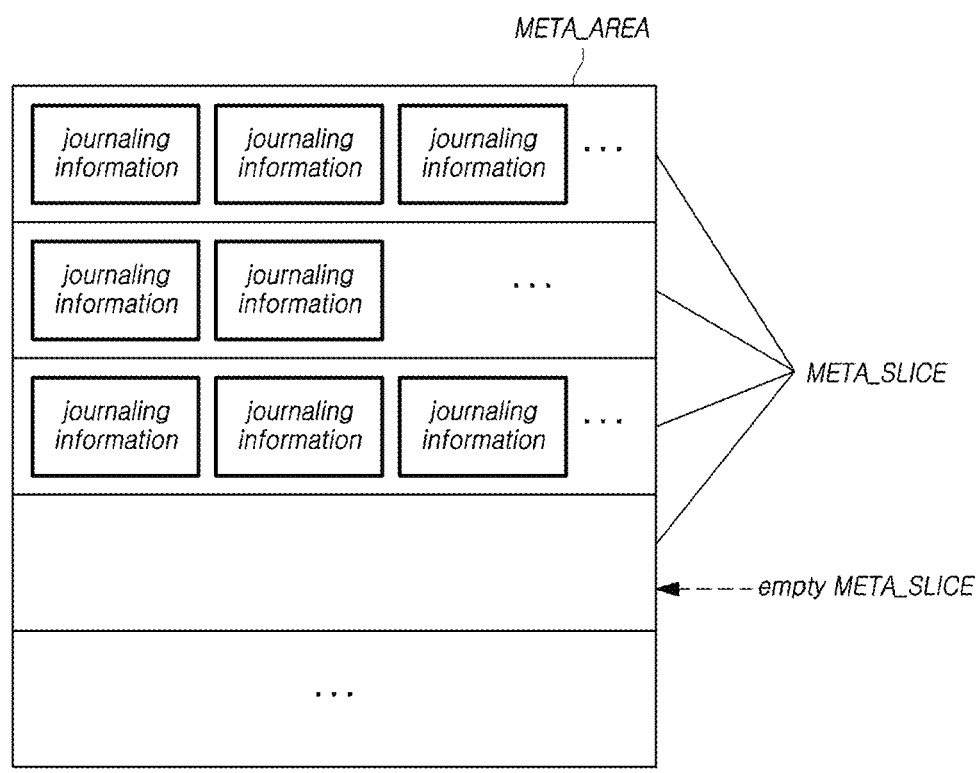
FIG. 10 is a diagram illustrating a meta-area included in a memory device based on some embodiments of the disclosed technology.

FIG. 10 is a diagram illustrating a meta-area included in the memory device 110 based on some embodiments of the disclosed technology.

In some implementations, the meta-area META AREA of the memory device 110 may include one or more meta slices META_SLICE.

Some of the meta slices META_SLICE may store journaling information but the others of the meta slices META_SLICE store no journaling information. If any one piece of the meta slices META_SLICE does not store any journaling information, the corresponding meta slice META_SLICE may be expressed as empty.

Figure 11:
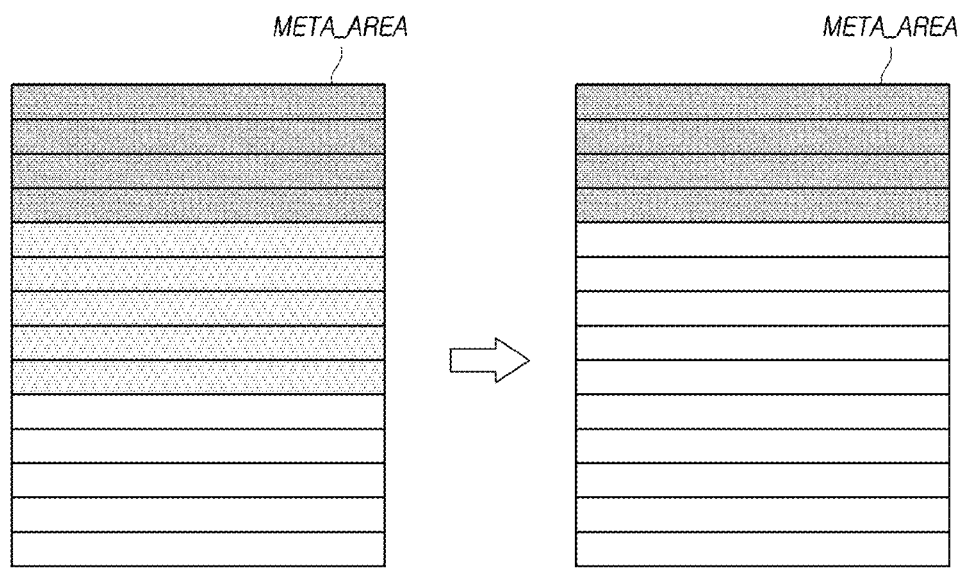
FIG. 11 is a diagram illustrating an operation of deleting, by a memory controller, journaling information stored in a memory device based on some embodiments of the disclosed technology.

FIG. 11 is a diagram illustrating an operation of deleting, by the memory controller 120, journaling information stored in the memory device 110 based on some embodiments of the disclosed technology.

In some implementations, the memory controller 120 may delete the meta slice META_SLICE including the corresponding journaling information from the meta-area META_AREA for deleting journaling information corresponding to the data stored in the target open memory block TGT_OPEN_BLK illustrated in FIG. 8, that is, the data stored in the open memory block OPEN_BLK for GC.

In this case, the meta-area META_AREA may include only an empty meta slice META_SLICE and a meta slice META_SLICE which does not include the journaling information corresponding to the data stored in the open memory block OPEN_BLK for GC. That is, the state of information stored in the meta-area META_AREA may be a state before the deleted journaling information is recorded.

The memory system 100 may perform a recovery operation after the SPO events as discussed below if the memory device 110 was not in the first state when the SPO occurred.

Figure 12:
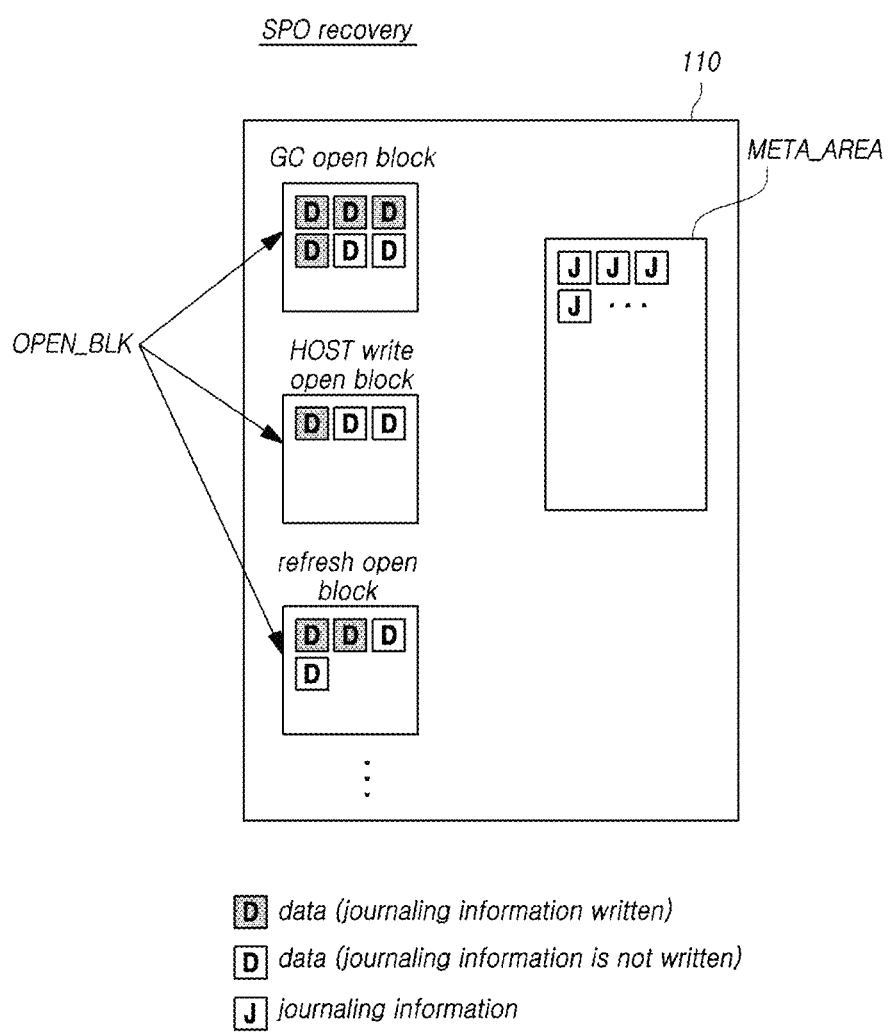
FIG. 12 is a diagram illustrating another example of performing a recovery operation after SPO events by a memory system based on some embodiments of the disclosed technology.

FIG. 12 is a diagram illustrating another example of performing a recovery operation after SPO events by the memory system 100 based on various embodiments of the disclosed technology.

In some implementations, the memory device 110 included in the memory system 100 may include three open memory blocks OPEN_BLK. For example, the three open memory blocks OPEN_BLK may be i) an open memory block for GC, ii) an open memory block for writing data received from the host HOST, and iii) an open memory block for refreshing data previously stored in the memory device 110.

In FIG. 12, journaling information associated with four pieces of data stored in the open memory block for GC may be written in the meta-area META_AREA, and journaling information associated with two pieces of data may not be written in the meta-area META_AREA.

Journaling information associated with one piece of data stored in the open memory block for writing the data received from the host HOST may be written to the meta-area META_AREA, and journaling information associated with two pieces of data may not be written to the meta-area META_AREA.

Journaling information associated with two pieces of data stored in the open memory block for refreshing the data previously stored in the memory device 110 may be written to the meta-area META_AREA, and journaling information associated with two pieces of data may not be written to the meta-area (META_AREA).

That is, journaling information associated with 7(=3+2+2) pieces of data among a total of 13 pieces of data stored in any one of the open memory blocks OPEN_BLK may be written to the meta-area META_AREA, and journaling information associated with 6(=2+2+2) pieces of data may not be written to the meta-area (META_AREA).

Figure 13:
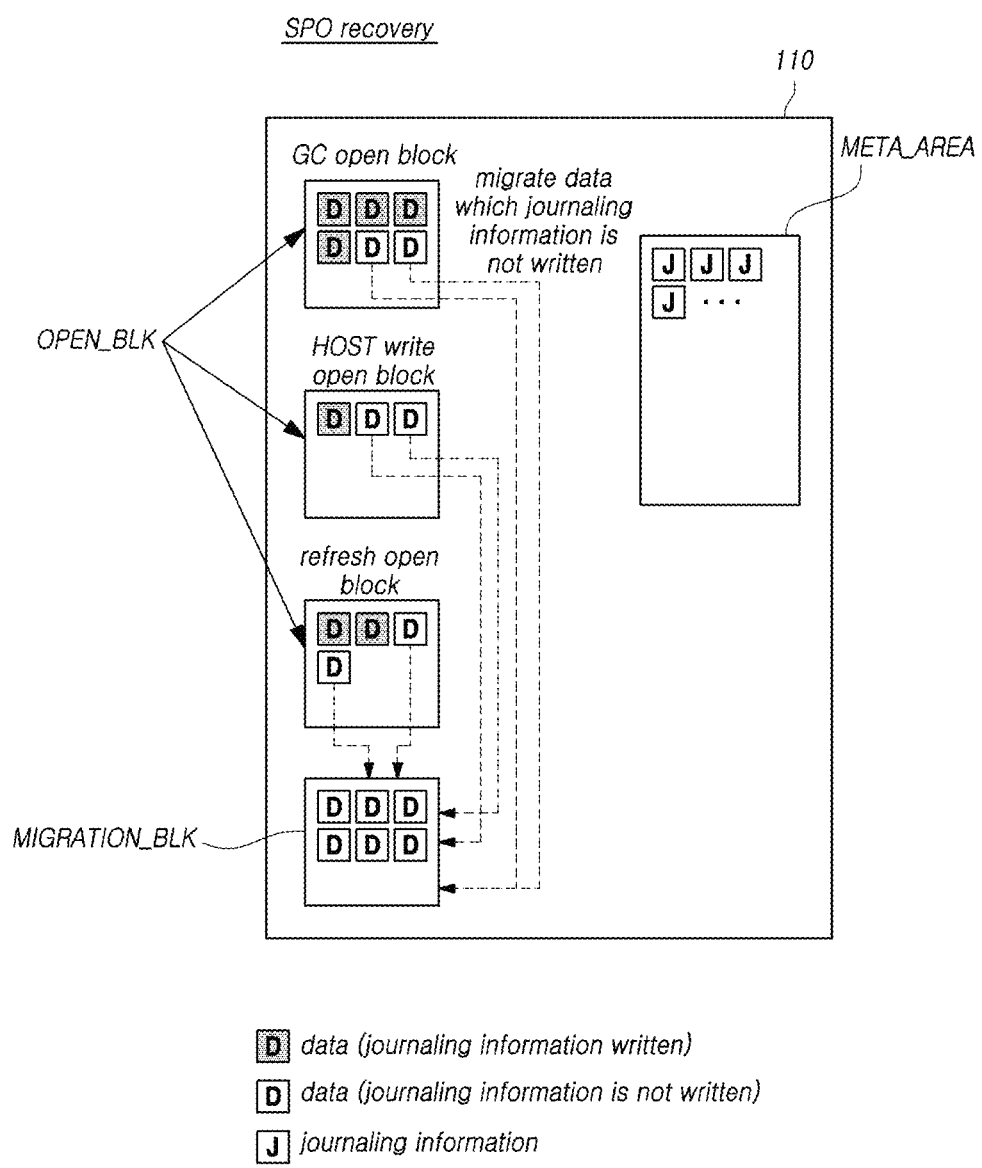
FIG. 13 is a diagram illustrating an operation of migrating data when a memory system based on some embodiments of the disclosed technology performs a recovery operation on SPO.

FIG. 13 is a diagram illustrating an operation of migrating data when the memory system 100 based on embodiments of the disclosed technology performs a recovery operation on SPO.

In some implementations, during the recovery operation on the SPO, the memory controller 120 may migrate, to a migration memory block MIGRATION_BLK, 6 pieces of data where its journaling information is not written to the meta-area META_AREA among 13 pieces of data stored in any one of the open memory blocks OPEN_BLK.

In this case, the migration memory block MIGRATION_BLK may include one or more free memory blocks among a plurality of memory blocks included in the memory device 110.

As described above, during the recovery operation after the SPO events, the memory controller 120 may write the data where its journaling information is not written among the data stored in the open memory block OPEN_BLK, to a new migration memory block MIGRATION_BLK.

Figure 14:
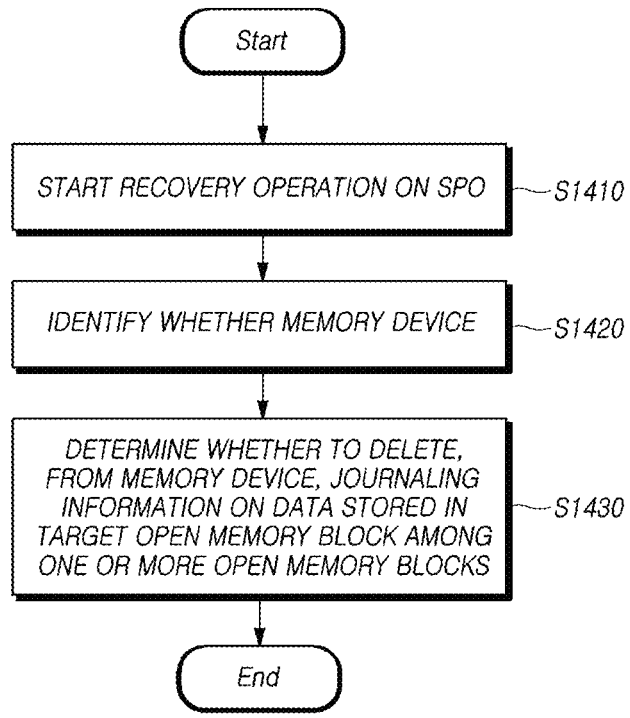
FIG. 14 is a flowchart illustrating a method of operating a memory controller based on some embodiments of the disclosed technology.

FIG. 14 is a flowchart illustrating a method of operating the memory controller 120 based on embodiments of the disclosed technology.

At operation S1410, the method of operating the memory controller 120 may include starting a recovery operation to recover from SPO after the SPO occurs.

At operation 1420, the method of operating the memory controller 120 may include identifying whether the memory device 110 is in a first state when the SPO occurs.

At operation 1430, the method of operating the memory controller 120 may include determining to delete, from the memory device 110, journaling information associated with data stored in a target open memory block among open memory blocks included in the memory device 110 based on whether the memory device 110 is in a first state when the SPO occurs. In this case, each of the open memory blocks may include one or more of a plurality of memory blocks included in the memory device 110.

If the memory device 110 is in the first state when the SPO occurs, the memory controller 120 may delete, from the memory device 110, the journaling information on the data stored in the target open memory block at the time of the recovery operation on the SPO thereafter.

If the memory device 110 is in a second state different from the first state, when the SPO occurs, the memory controller 120 may migrate, to a migration memory block of the memory device 110, data where its journaling information is not written to the memory device among data stored in the open memory blocks at the time of the recovery operation on the SPO thereafter.

In some implementations, the operations of the memory controller 120 described above may be controlled by the control circuit 123, and the processor 124 may be performed in a manner in which all the operations of the memory controller 120 are executed by programmed firmware.

Figure 15:
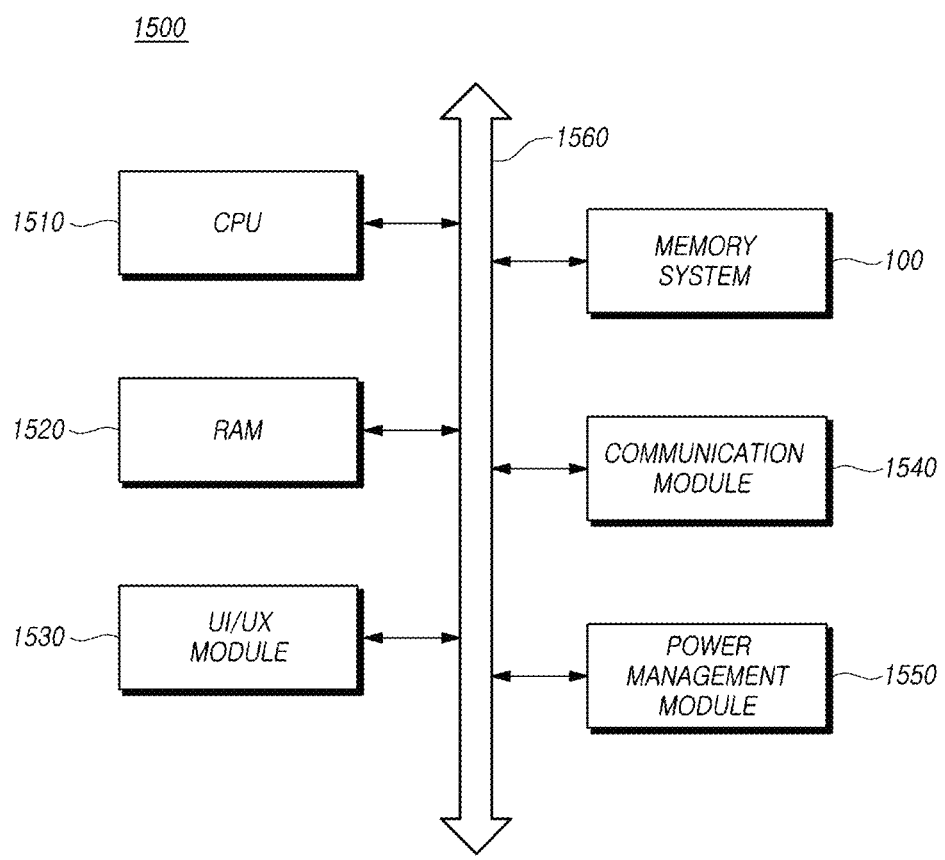
FIG. 15 is a diagram illustrating the configuration of a computing system based on an embodiment of the disclosed technology.

FIG. 15 is a diagram illustrating the configuration of a computing system 1500 based on an embodiment of the disclosed technology.

Referring to FIG. 15, the computing system 1500 based on an embodiment of the disclosed technology may include: a memory system 100 electrically connected to a system bus 1560; a CPU 1510 configured to control the overall operation of the computing system 1500; a RAM 1520 configured to store data and information related to operations of the computing system 1500; a user interface/user experience (UI/UX) module 1530 configured to provide the user with a user environment; a communication module 1540 configured to communicate with an external device in a wired and/or wireless type; and a power management module 1550 configured to manage power used by the computing system 1500.

The computing system 1500 may be a personal computer (PC) or may include a mobile terminal such as a smartphone, a tablet or various electronic devices.

The computing system 1500 may further include a battery for supplying an operating voltage, and may further include an application chipset, a graphic-related module, a camera image processor (CIS), and a DRAM. Other elements would be obvious to a person skilled in the art.

The memory system 100 may be implemented in configurations to include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), and a ferroelectric RAM (FRAM). In addition, the memory system 100 may be implemented as storage devices of various types and mounted inside various electronic devices.

Based on embodiments of the disclosed technology described above, the operation delay time of the memory system may be minimized. In addition, based on an embodiment of the disclosed technology, an overhead occurring in the process of calling a specific function may be minimized. Although various embodiments of the disclosed technology are described for illustrative purposes, those skilled in the art will appreciate that various modifications, additions and substitutions are possible, without departing from the scope and spirit of the disclosed technology.

What is claimed is:

1. A memory system comprising:
a memory device configured to include memory cells for storing data that are divided into a plurality of memory blocks, each memory block including memory cells; and
a memory controller configured to control the memory device, and to perform a recovery operation after occurrence of sudden power off (SPO),
wherein, in performing the recovery operation, upon a determination that the memory device is in a first state in which a garbage collection was in progress when the SPO occurs, the memory controller deletes, from the memory device, journaling information including logging information about changes not yet committed and associated with data stored in a target open memory block, among one or more open memory blocks including one or more of the plurality of memory blocks at the time of the recovery operation, and after determining that the memory device is in a second state different from the first state when the SPO occurs, the memory controller migrates, to a migration memory block of the memory device, data for which corresponding journaling information is not written to the memory device among data stored in the one or more open memory blocks at the time of the recovery operation.

2. The memory system of claim 1, wherein upon a determination that a garbage collection is in progress when the SPO occurs, the memory controller is configured to determine, after the garbage collection is executed, that the memory device is in the first state when the SPO occurs.

3. The memory system of claim 2, wherein the target open memory block is an open memory block that stores data that is targeted to be migrated during the garbage collection.

4. The memory system of claim 3, wherein the number of the open memory blocks is one.

5. The memory system of claim 1, wherein the journaling information includes i) a logical address, ii) a source physical address, or iii) a target physical address for data corresponding to the journaling information.

6. The memory system of claim 5, wherein the memory controller stores the journaling information in a meta information slice configured to store meta data corresponding to user data that is stored in the memory device.

7. A memory controller for a memory device including a plurality of memory blocks, comprising:
a memory interface in communication with the plurality of memory blocks of the memory device; and
a control circuit in communication with the memory interface to control the memory device and configured to perform a recovery operation from a sudden power off (SPO), wherein, in the recovery operation, upon a determination that the memory device is in a first state in which a garbage collection was in progress when the SPO occurs, the control circuit deletes, from the memory device, journaling information including logging information about changes not yet committed and associated with data stored in a target open memory block, among one or more open memory blocks including one or more of the plurality of memory blocks at the time of the recovery operation, and after determining that the memory device is in a second state different from the first state when the SPO occurs, the control circuit migrates, to a migration memory block of the memory device, data for which corresponding journaling information is not written to the memory device among data stored in the one or more open memory blocks at the time of the recovery operation.

8. The memory controller of claim 7, wherein, upon a determination that a garbage collection is in progress when the SPO occurs, the control circuit determines that the memory device is in the first state when the SPO occurs.

9. The memory controller of claim 8, wherein the target open memory block is an open memory block that stores data that is targeted to be migrated during the garbage collection.

10. The memory controller of claim 9, wherein the number of the open memory blocks is one.

11. The memory controller of claim 7, wherein the journaling information includes: i) a logical address, ii) a source physical address, or iii) a target physical address for data corresponding to the journaling information.

12. The memory controller of claim 11, wherein the control circuit stores the journaling information in a meta information slice configured to store meta data corresponding to user data that is stored in the memory device.

13. A method of operating a memory controller for controlling a memory device including a plurality of memory blocks, the method comprising:
starting a recovery operation to recover from a sudden power off (SPO);
identifying whether the memory device is in a first state in which a garbage collection was in progress when the SPO occurs; and
deleting, upon a determination that a garbage collection was in progress when the SPO occurs, from the memory device, journaling information including logging information about changes not yet committed and associated with data stored in a target open memory block, among one or more open memory blocks including one or more of the plurality of memory blocks at the time of the recovery operation, and, after determining that the memory device is in a second state different from the first state when the SPO occurs, migrating, to a migration memory block of the memory device, data for which corresponding journaling information is not written to the memory device among data stored in the one or more open memory blocks at the time of the recovery operation.

14. The method of claim 13, wherein, upon a determination that a garbage collection was in progress when the SPO occurs, it is determined that the memory device is in the first state when the SPO occurs.

* * * * *